(12) United States Patent
Oliver et al.

(10) Patent No.: US 11,263,500 B2
(45) Date of Patent: Mar. 1, 2022

(54) IMAGE DETECTION METHODS AND APPARATUS

(71) Applicant: Trend Micro Incorporated, Tokyo (JP)

(72) Inventors: Jonathan James Oliver, Kew (AU); Yun-Chian Chang, Merced (CA)

(73) Assignee: Trend Micro Incorporated, Tokyo (JP)

( * ) Notice: Subject to any disclaimer, the term of this patent is extended or adjusted under 35 U.S.C. 154(b) by 336 days.

(21) Appl. No.: 16/536,019

(22) Filed: Aug. 8, 2019

(65) Prior Publication Data
US 2020/0026969 A1    Jan. 23, 2020

Related U.S. Application Data

(63) Continuation of application No. 11/617,603, filed on Dec. 28, 2006, now abandoned.

(51) Int. Cl.
*G06K 9/36*    (2006.01)
*G06K 9/64*    (2006.01)

(52) U.S. Cl.
CPC ..................... *G06K 9/64* (2013.01)

(58) Field of Classification Search
None
See application file for complete search history.

(56) References Cited

U.S. PATENT DOCUMENTS

| | | | |
|---|---|---|---|
| 2004/0236884 A1* | 11/2004 | Beetz ............. | H04L 63/145 710/68 |
| 2005/0091321 A1* | 4/2005 | Daniell ............ | H04L 51/12 709/206 |
| 2005/0216564 A1* | 9/2005 | Myers ............. | H04L 51/12 709/206 |
| 2006/0193159 A1* | 8/2006 | Tan ................. | G06F 16/9014 365/49.16 |
| 2008/0127340 A1* | 5/2008 | Lee ................. | H04L 51/12 726/22 |

* cited by examiner

*Primary Examiner* — Soo Jin Park
(74) *Attorney, Agent, or Firm* — Patrick D. Benedicto

(57) ABSTRACT

A method for designating a given image as similar/dissimilar with respect to a reference image is provided. The method includes normalizing the image. Normalizing includes performing pre-processing and a lossy compression on the given image to obtain a lossy representation. The pre-processing includes at least one of cropping, fundamental extracting, gray scale converting and lower color bit converting. The method also includes comparing the lossy representation of the given image with a reference representation, which is a version of a reference spam image after the reference spam image has undergone a similar normalizing process as normalizing. The method further includes, if the lossy representation of the given image matches the reference representation, designating the given image similar to the reference image. The method yet also includes, if the lossy representation of the given image does not match the reference representation, designating the given image dissimilar to the reference image.

20 Claims, 2 Drawing Sheets

IMAGE DETECTION METHODS AND APPARATUS

CROSS-REFERENCE TO RELATED APPLICATION(S)

The present application is a continuation of U.S. patent application Ser. No. 11/617,603, filed Dec. 28, 2006, entitled "Image Detection Methods and Apparatus," the disclosure of which is hereby incorporated by reference.

BACKGROUND OF THE INVENTION

Image detection refers to process of comparing two images to ascertain whether they represent substantially the same image or are different images. In many applications, the ability to ascertain whether an image is substantially the same as another image even if the two images do not exactly match is highly useful. An application that may find use for such an image detection capability is spam detection software.

Spamming, in the context of the instant disclosure, refers to the practice of sending uninvited emails and/or other forms of visually perceptible electronic communication to recipients. Although spam communication may be transmitted for many reasons, a common purpose for spamming is to send out unsolicited advertisement to a large number of email recipients. In this disclosure, emails are employed as examples of spam. However, the discussion herein also apply without limitation to other forms of visually perceptible electronic communication, such as instant messaging, video streaming, for example.

Spamming is at best an annoyance since the uninvited communication wastes time and personal resources, as well as enterprise resources. In more severe cases, a large number of spam emails may, for example, paralyze an email system or a network, and/or may clog the recipient's email inbox to such an extent that important emails may become lost among the voluminous spam emails.

As the practice of spamming proliferates, techniques have evolved to enable enterprises and individuals to detect and filter out spam emails, thereby effectively preventing their transmission and/or preventing the spam emails from reaching the intended recipient(s). Traditionally, spam emails are text-based in that the spam content (e.g., the advertisement) is communicated textually in the email. In some cases, embedded links are employed to link to external images or other information in order to generate and present the spam content in the spam emails. Text-based spam emails and spam emails that employ embedded links are currently detected using techniques such as keyword detection, statistical filters, domain name filtering, URL filtering, etc.

In response, spammers have increasingly employed more sophisticated spamming techniques calculated to evade detection. Image-based spam emails have evolved out of this effort and are increasingly becoming a serious problem. In an image-based spam email, the spam content (e.g., the advertising content) is embedded in the image itself instead of being text-based. In other words, the spam content is now transmitted to the recipient's device for viewing (such as a browser for example) as an image instead of as text. Since many legitimate organizations also employ images (e.g., a corporate logo, signatures, photographs, etc.) in their emails, it is not possible to simply filter out all emails that embed images. Consequently, techniques need to be developed to distinguish between an image-based spam email and a legitimate email that happens to employ an image.

Image-based spams are challenging for traditional spam detection techniques (such as keyword analysis and/or other textually-based filters) to detect since these techniques rely on the analysis of textual information to perform their spam detection work. In order to adapt these techniques to detect spam in modern image-based spam emails, much work has to be performed to convert the image-based spam content to text before detection can be performed.

For example, OCR (optical character recognition) has often been employed to obtain the spam content in text form in order to facilitate detection using traditional spam detection techniques. OCR is, however, a time-consuming and resource-intensive approach, and the result of which is not always 100% accurate. OCR-based approaches are also easily fooled by sophisticated spammers, who may for example generate wavy text or add a splotchy background in a manner that does not materially impact the readability of the spam content by a human but nevertheless renders it difficult for an OCR system to accurately recognize the textual information. If the image-based spam emails do not employ embedded links, filters that rely on black lists of known spammers based on their URLs cannot be satisfactorily employed to detect spam.

Image analysis/comparison has been employed to ascertain whether an imaged-based email is spam or is a legitimate email that also happens to employ one or more images. If the spam image is known in advance (e.g., from previous experience with the spam), comparing this known spam image against the image presented in the suspect spam email would reveal whether the suspect spam email is indeed a spam email.

In an example prior art approach, the known spam image is hashed in advance to obtain a first hash value. This first hash value is then stored in a spam signature database. Hashing is a well known mathematical technique and will not be discussed in great details herein. When a suspect image-based email is received, the image in the suspect imaged-based email is also hashed to obtain a second hash value. These two hash values are then compared against one another. If the images are identical, their hash images would match, and software may then flag the suspect email as spam.

As time evolves, spammers turn to techniques that manipulate the image in the image-based spam email in order to alter its hash value and avoid detection. For example, the spammer may employ an image template to embed the spam content. From this spam image template, the spammer may generate different variations of the image template in order to cause the hash generator of the spam detection software to generate different hash values for the different variations of the spam image template. Example variations include changing the dimension of the image, changing the background color, adding visual artifacts, removing visual artifacts, etc. Since the received images are different from one another, the hash values of the received images would also vary. Accordingly, a spam detection approach that relies solely on a comparison of the hash values of the spam images often fail to detect these more sophisticated spamming techniques.

SUMMARY OF INVENTION

The invention relates, in an embodiment, to a method for designating a given image as similar or dissimilar with respect to a reference image. The method includes normalizing the image. Normalizing includes performing pre-processing and a lossy compression on the given image to obtain a lossy representation of the image. The pre-processing includes at least one of cropping, fundamental extracting, gray scale converting and lower color bit converting. The method also includes comparing the lossy representation of the given image with a reference representation, which is a version of a reference spam image after the reference spam image has undergone a similar normalizing process as normalizing. The method further includes, if the lossy representation of the given image matches the reference representation, designating the given image similar to the reference image. The method yet also includes, if the lossy representation of the given image does not match the reference representation, designating the given image dissimilar to the reference image.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
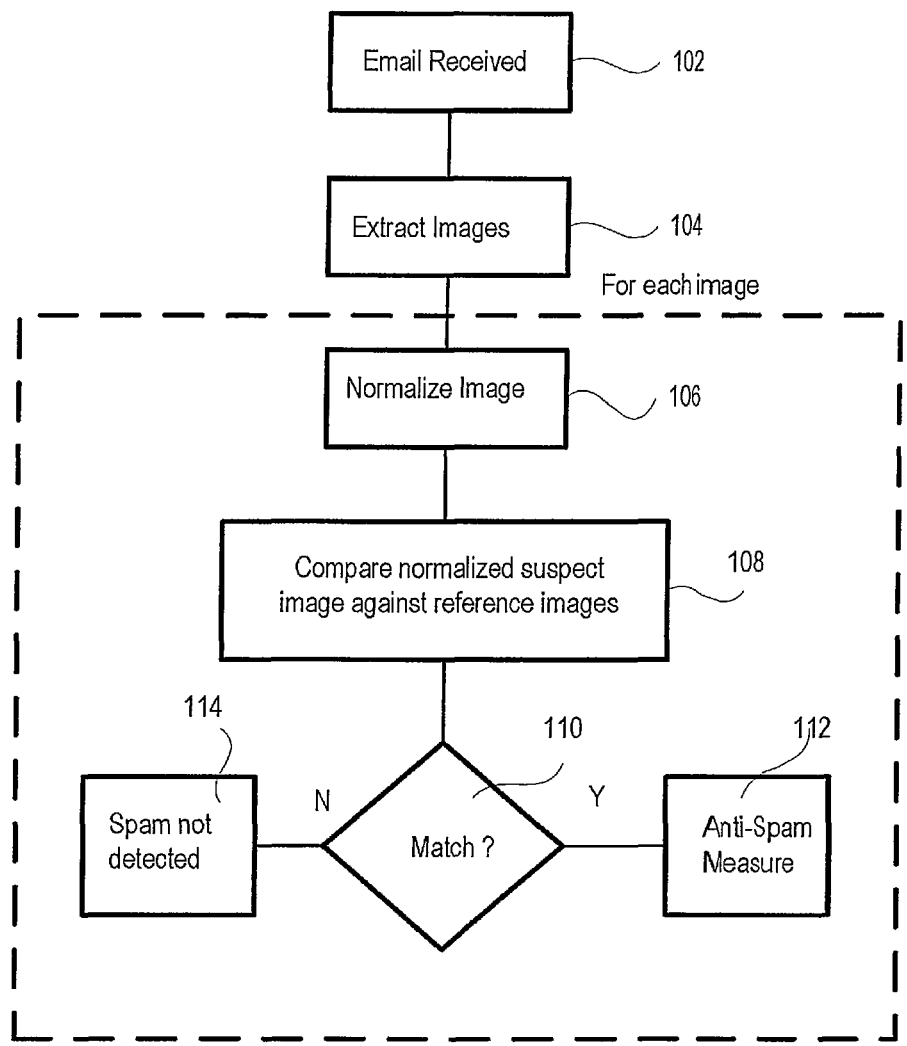
FIG. 1 shows, in accordance with an embodiment of the invention, the steps for detecting spam in image-based emails.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with one or more embodiments of the invention, there are provided techniques for detecting whether two images are substantially identical even if they are not exactly identical of one another. This may happen if, for example, one of the images has been degraded or damaged or altered, whether intentionally or unintentionally. In the context of an anti-spam application, for example, the inventive technique involves normalizing images in a suspect visually-perceptible electronic communication (VPEC) so as to effectively neutralize attempts at evading spam detection. In the following paragraphs, emails will be discussed as examples of VPECs. It should be kept in mind, however, that the techniques disclosed herein are applicable to other forms of VPECs, including for example instant messages, streamed multimedia, pictures, video, etc, as well as to any application requiring the ability to compare two images for substantially identical identification.

In an embodiment, images in a suspect email are extracted and normalized. The inventors herein realize that attempts to vary the spam content in an image-based spam often involves superficial modifications to the fundamental image itself. As the term is employed herein, the fundamental image represents the spam content that the spammer wishes to communicate to their recipients. While these superficial modifications (such as changing the dimension, adding visual artifacts such as lines or additional background decoration or shading, changing color, etc.) to the fundamental image or image template may render the resultant image superficially "different" from the reference spam image against which the suspect image is compared, the differences can be attributable largely to these modifications. This is because for a spam, such as an advertisement, to be effective, the spammer needs to preserve enough of the spam content or fundamental image so that the underlying advertisement may be readily understood by the recipient.

By normalizing the suspect image, the inventors seek to remove the "noise" from the fundamental image that embodies the spam content. In other words, normalization seeks to remove the information contributed by minor variations to the fundamental image. Once normalized, the normalized suspect image may be compared against reference images of known spams. If there is a match between the suspect image and one of the reference images, the spam is detected and spam remediation measures may be undertaken.

For the purpose of the present disclosure, reference images of known spams may be thought of as stored signatures of known spam images. Each reference image represents a known spam image that has been normalized to facilitate comparison against the normalized suspect image. By comparing the normalized suspect image against these normalized known spam images, spam detection is possible even if the spammer had attempted to evade detection by performing minor variations to the fundamental image.

In an embodiment, the suspect image is processed in two stages: pre-processing and lossy compression. Pre-processing has the effect of simplifying the suspect image, thereby enabling the suspect image to be represented by a smaller amount of data. The smaller amount of data advantageously renders the subsequent compression and comparison processes more efficient. Pre-processing also has the effect of removing from the image some of the information attributable to the spammer's anti-detection modifications to the fundamental image.

For example, the suspect image may undergo fundamental extraction, be converted to gray-scale and/or cropped as part of the pre-processing. Fundamental extraction refers to the process of identifying color/texture employed to present the fundamental information (such as the spam text). Once the fundamental information is identified, the contrast between the fundamental information can be exaggerated such that, for example, the fundamental information is in one color (such as black) and all other parts of the image is muted for contrast (e.g., turning white). In this manner, the information that results fro changes to non-fundamental aspects of the image are essentially removed after fundamental extraction.

Converting the image to gray-scale also has the effect of substantially removing or attenuating the contribution made by minor changes to the image color and also simplifies the suspect image for the subsequent comparison since fewer bits are required to represent an image in gray-scale.

Cropping refers to the removal of at least a portion of the periphery of the suspect image such that the contribution made by changing the borders or dimension of the fundamental image is effectively negated. Different cropping strategies may be employed. For example, the suspect image may be cropped to a fixed size to remove its border, or image analysis may be performed to ascertain the image area likely to contain the fundamental image, thereby enabling the rest of the suspect image to be cropped. Neither gray-scaling nor cropping are absolutely necessary, and cropping may be performed before the conversion to gray-scale or may be performed after the gray-scale conversion.

In an embodiment, instead of gray-scale conversion, the suspect image may be converted from its original color representation to a color representation that employs fewer bits per pixel (lower color bit converting) such that the image, while still in color, may be represented by fewer bits of information. In an embodiment, pre-processing may also include normalizing the overall image intensity so that the suspect image is closer in intensity to the reference images, thereby substantially negating the effects of darkening or lightening the entire image.

After pre-processing, the resultant suspect image is compressed using a lossy compression technique. Lossy compression has the effect of further removing noise from the image, thereby effectively ignoring the information contributed by minor variations to the image template. In general, any lossy compression technique may be employed. The result after pre-processing and lossy compression is a normalized suspect image.

Thereafter, the normalized suspect image is compared against the reference images, i.e., known spam images that have already been similarly normalized and stored as signatures of known spams. The comparison may be performed in any suitable manner, including using hash values representative of the normalized images.

If any normalized suspect image of a suspect email matches one of the reference images, the email is considered a possible spam, and spam remediation measures may be undertaken. Spam remediation may include, for example, flagging the email for further analysis, blocking the spam email and/or adding the normalized spam image to the database of reference spam images for future use.

As discussed, legitimate emails may also employ images for legitimate purposes. Corporate logos, signatures, pictures, etc., are examples of images that may be legitimately employed in an email. In an embodiment, the legitimate images may be stored in a database of legitimate images. This database may then be employed by a statistical filter-based spam detector that flags emails based on their use of images (e.g., those that look for the "scr=cid:" syntax) to help in ascertaining whether a particular suspect image is a spam image.

These legitimate images may be collected in any suitable manner. For example, the legitimate images may be collected via a registration procedure during which legitimate businesses may register their legitimate images. Trusted human users may also be allowed to add images they deem to be legitimate to the legitimate image database. False positives from spam detection software, which have been subsequently resolved to be non-spam images, may also be added to the database. If all images of a particular email are found to be non-spam, those images may also be added to the database. In this manner, a database of legitimate images (or representations thereof) may be created and continually updated to facilitate the correct identification of legitimate emails, thereby reducing false positives and the erroneous blocking of legitimate emails.

The features and advantages of embodiments of the invention may be better understood with reference to the figures and discussions that follow. FIG. 1 shows, in accordance with an embodiment of the invention, the steps for detecting spam in image-based emails. The detection may be performed at a router, an email gateway or may be made part of a recipient's email system, for example. In step 102, an email is received. In step 104, images in the email are extracted. Each of these suspect images is then processed in accordance with subsequent steps 106, 108, 110 and 112/114.

In step 106, the suspect image is normalized. As discussed, normalization is performed to reduce the amount of information required to represent the suspect image, thereby enabling subsequent processing steps on the image to be more efficiently performed with less computing resource. Normalization may also remove some or all of the noise in the image by removing the information contributed by visual variations on the fundamental image that embodies the spam content. Normalization may also equalize the image intensity and/or other image characteristics across all images, rendering the subsequent comparison more accurate.

Figure 2:
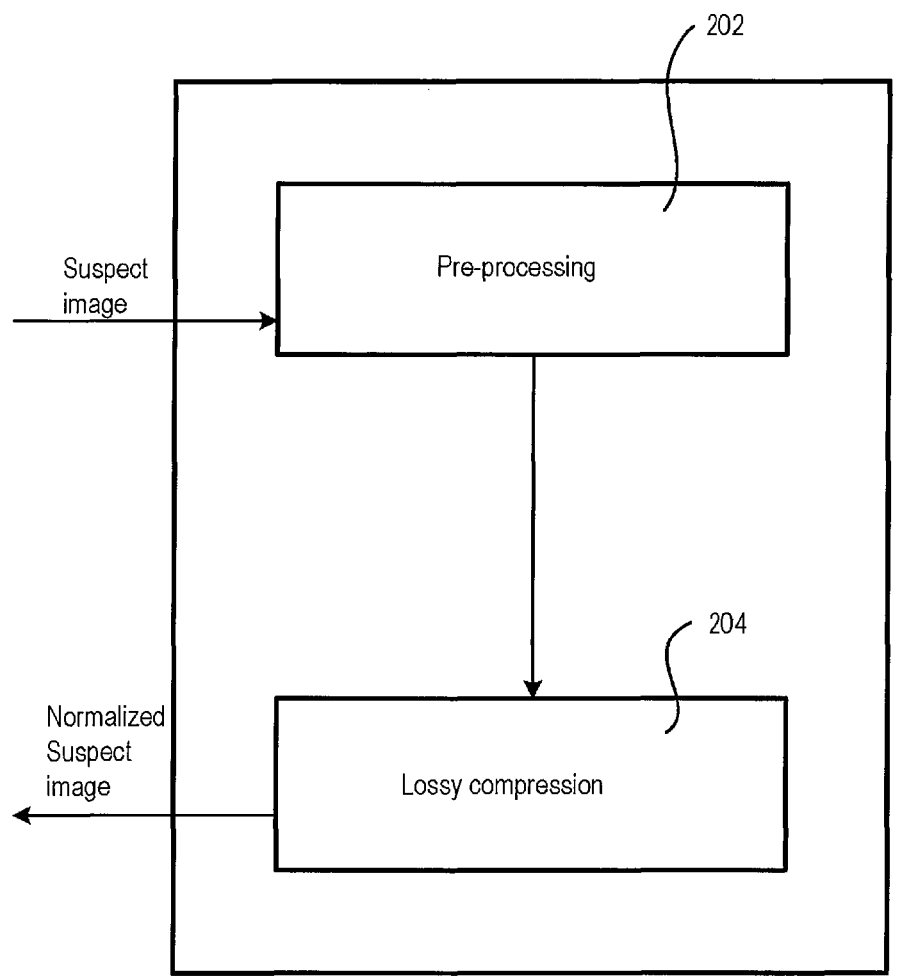
FIG. 2 shows, in accordance with an embodiment of the invention, the steps in normalizing an image.

FIG. 2 shows, in accordance with an embodiment of the invention, the steps in normalizing an image. Normalizing may involve both pre-processing (202) and lossy compression processing (204).

Pre-processing (202) may include one or more of the aforementioned processing techniques such as gray-scale conversion, cropping, equalizing the image intensity or other image characteristics with those of the reference images, converting to a color representation that requires fewer color bits per image, etc.

In an embodiment, lossy compression (204) may include any technique that reduces the image information further. For example, JPEG (a compression standard promulgated by the Joint Photographic Experts Group) compression may be performed. In another embodiment, the image may be divided into blocks, each having N by M (N×M) pixels whereby N and M are integers. An average value or median or any other statistical measure or mathematical representation may be computed for each block, resulting in a matrix of statistical values representing the former image. Irrespective of the exact lossy compression or lossy representation technique employed, the image is substantially distilled. It is the belief of the inventors herein that the normalized image after such lossy compression/representation is substantially unchanged across detection-evading image variations.

Returning to FIG. 1, in step 108, the normalized image is compared against a database of reference images, which represents a database of normalized known spam images. If the normalized image of the suspect image matches any of the reference images (110), spam is detected and spam remediation measures may be undertaken (112). As mentioned, spam remediation may include flagging the email for further analysis, or blocking the spam email.

On the other hand, if the normalized suspect image does not match any of the reference images (110), spam has not been detected in the suspect image (114). In an embodiment, the suspect image may, if desired, be inspected further by other techniques to ensure that spam is not present. In an embodiment, images in an email that does not include any spam image are considered suitable candidates for adding to the database of legitimate images. As discussed, this data base of legitimate images maybe employed to enhance the accuracy of spam detection techniques such as statistical filter-based techniques.

As can be appreciated from the foregoing, embodiments of the invention are capable of detecting spam in image-based emails even if the spammer deliberately attempt to vary certain aspects of the spam image in an attempt to evade detection. By normalizing the suspect image prior to comparing the normalized image against a database of reference images, the "noise" information, which is contributed by detection-evading attempts at varying the fundamental image or image template, is substantially removed. The resultant normalized image is thus a representation of the image with less, often substantially less, of the noise information contributed by the detection-evading attempts at varying the spam image. The normalization also, in an embodiment, reduces the amount of information required to represent the image, thereby substantially reducing the processing requirement in the subsequent comparison step when the normalized image may be compared against thousands or more normalized known spam images.

While this invention has been described in terms of several preferred embodiments, there are alterations, permutations, and equivalents, which fall within the scope of this invention. Also, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fall within the true spirit and scope of the present invention.

What is claimed is:

1. A method for designating a given image as similar or dissimilar with respect to a reference image, comprising:
normalizing said image including performing pre-processing and a lossy compression on said given image to obtain a lossy representation of said image, said pre-processing including at least one of cropping, fundamental extracting to identify color and/or texture employed to present spam text, gray scale converting and lower color bit converting;
comparing said lossy representation of said given image with a reference representation, said reference representation being a version of a reference spam image after said reference spam image has undergone a similar normalizing process as said normalizing;
if said lossy representation of said given image matches said reference representation, designating said given image similar to said reference image; and
if said lossy representation of said given image does not match said reference representation, designating said given image dissimilar to said reference image.

2. The method of claim 1 wherein said pre-processing represents said cropping.

3. The method of claim 2 wherein said cropping is configured to at least partially remove a peripheral portion of said image.

4. The method of claim 2 wherein said pre-processing represents said fundamental extracting.

5. The method of claim 2 wherein said pre-processing represents said gray scale converting.

6. The method of claim 2 wherein said pre-processing represents said lower color bit converting.

7. The method of claim 1 wherein said pre-processing represents said fundamental extracting.

8. The method of claim 1 wherein said pre-processing represents said gray scale converting.

9. The method of claim 1 wherein said pre-processing represents said lower color bit converting.

10. The method of claim 1 wherein said lossy compression represents a block-based compression technique.

11. The method of claim 1 wherein said lossy compression represents a JPEG image reduction technique.

12. A method for designating whether a given email is a spam email, comprising:
extracting a set of email components from said given email, at least a first component of said set of email components is an image;
ascertaining whether said first component is a spam component, including normalizing said first component, including performing a lossy compression on one of said first component and a processed version of said first component;
comparing said lossy representation of said first component with a reference representation, said reference representation being a version of a reference spam image after said reference spam image has undergone a similar normalizing process as said normalizing;
if said lossy representation of said first component matches said reference representation, performing anti-spam measures with respect to said given email.

13. The method of claim 12 wherein said processed version is obtained by at least cropping said first component.

14. The method of claim 13 wherein said processed version is obtained by also converting one of a cropped version of said first component and said first component to gray scale.

15. The method of claim 14 wherein said cropping is configured to at least partially remove a peripheral portion of said image.

16. The method of claim 13 wherein said processed version is obtained by also converting one of a cropped version of said first component and said first component to a color representation that requires fewer bits per pixel to represent when compared to said first component.

17. The method of claim 16 wherein said cropping is configured to at least partially remove a peripheral portion of said image.

18. The method of claim 12 wherein said lossy compression represents a block-based compression technique.

19. The method of claim 12 wherein said lossy compression represents a JPEG image reduction technique.

20. An article of manufacture embodying a non-transitory computer readable medium storing computer readable code configured for designating a given image as similar or dissimilar with respect to a reference image, comprising:

computer readable code for normalizing said image including performing pre-processing and a lossy compression on said given image to obtain a lossy representation of said image, said pre-processing including at least one of cropping, fundamental extracting to identify color and/or texture employed to present spam text, gray scale converting and lower color bit converting;

computer readable code comparing said lossy representation of said given image with a reference representation, said reference representation being a version of a reference spam image after said reference spam image has undergone a similar normalizing process as said normalizing;

computer readable code designating, if said lossy representation of said given image matches said reference representation, said given image similar to said reference image; and computer readable code designating, if said lossy representation of said given image does not match said reference representation, said given image dissimilar to said reference image.

\* \* \* \* \*